United States Patent
Huang (10) Patent No.: US 7,540,061 B1
(45) Date of Patent: Jun. 2, 2009

(54) ARRAY COMBINATIONAL TYPE OF WINDSHIELD WIPER

(76) Inventor: Shih-Hsien Huang, 7F.-2, No.37, Jhengsin St., Zuoying District, Kaohsiung City (TW) 813

( * ) Notice: Subject to any disclaimer, the term of this patent is extended or adjusted under 35 U.S.C. 154(b) by 0 days.

(21) Appl. No.: 12/071,304

(22) Filed: Feb. 20, 2008

(51) Int. Cl.
*B60S 1/38* (2006.01)

(52) U.S. Cl. ............................. 15/250.201; 15/250.43

(58) Field of Classification Search ............. 15/250.43, 15/250.44, 250.201, 250.361
See application file for complete search history.

(56) References Cited

U.S. PATENT DOCUMENTS

| | | | | |
|---|---|---|---|---|
| 2,651,800 A | * | 9/1953 | Picon ....................... | 15/250.43 |
| 2,847,694 A | * | 8/1958 | Chambers ................. | 15/250.43 |
| 3,088,155 A | * | 5/1963 | Smithers ................. | 15/250.201 |
| 4,976,001 A | * | 12/1990 | Wright ..................... | 15/250.48 |
| 6,588,048 B2 | * | 7/2003 | Ohyama ................... | 15/250.43 |
| 7,150,066 B1 | * | 12/2006 | Huang ..................... | 15/250.201 |
| 7,254,862 B2 | | 8/2007 | Hoshino .................. | 15/250.47 |
| 2006/0090282 A1 | | 5/2006 | Hoshio ..................... | 15/250.44 |
| 2006/0179597 A1 | | 8/2006 | Hoshino et al. .......... | 15/250.43 |

FOREIGN PATENT DOCUMENTS

JP      10-6932    *   1/1998

* cited by examiner

*Primary Examiner*—Gary K Graham
(74) *Attorney, Agent, or Firm*—Bacon & Thomas, PLLC (57) ABSTRACT

An array combinational type of windshield wiper comprises an elastic curved strip, a supporting mount, and a plural of lodging blocks and counterweight blocks disposed on the elastic strip in an array. Two enclosing sheaths are disposed on the elastic strip such that they are coupled to the array of lodging blocks and counterweight blocks. This arrangement provides flexibility in matching the length of the array of lodging blocks and counterweight blocks with the length of the elastic curved strip such that various windshield wipers of different lengths and specifications can be easily produced.

3 Claims, 11 Drawing Sheets

ARRAY COMBINATIONAL TYPE OF WINDSHIELD WIPER

FIELD OF THE PRESENT INVENTION

The present invention relates to an array combinational type of windshield wiper, particularly for one that not only evenly distributes the pressing elastic pressure over the windshield of various curvature but also completely and closely attaches over the windshield of different length and specifications so as to increase the scraping and wiping effect of the windshield wiper by means of suitably changing the number and array of the lodging block and counterweight block together with the length of the elastic curved strip. Thus, the manufacturing cost of the windshield wiper can be considerably reduced other than the effective scraping and wiping function of the windshield wiper.

BACKGROUND OF THE INVENTION

Following with the considerably increasing number of the various vehicles produced and marketed, the usage quantity of the windshield wiper is tremendously increased. To regularly replacing the windshield wiper for the safe purpose becomes one of the necessary routine jobs that also makes the consuming quantity of the windshield wiper relatively increase. However, different vehicle model has different superficial area of the windshield, so the length requirement of the windshield wiper is different from vehicle to vehicle. How to produce various windshield wipers in different lengths and specifications in effective and economical manufacturing process becomes the critical task and challenges to the businessmen of the windshield wiper. Accordingly, the structure of the windshield wiper is constantly changed and continuously improved. For examples, the U.S. Pat. No. 7,254,862 and application published cases in numbers of US2006/0090282 and US2006/0179597 are the examples of prior arts in the related technical field. By carefully studying the technical disclosure for such cases aforesaid, the primary task is to provide various windshield wipers for different vehicles having feature in even pressure distribution over the windshield with firm and close attachment other than the declaration of double benefit in simplifying structure and reducing manufacturing cost.

However, it is generally well known that the superficial area of the windshield for sedan, recreational vehicle, van and truck is different from vehicle to vehicle. Therefore, the length and curvature of the windshield wiper must be different in accordance with the different requirement of each type of vehicle so as to have effective scraping and wiping function of the windshield wiper. In other words, the larger superficial area of the windshield is the longer of the windshield wiper needs. For certain length of the specific windshield wiper aforesaid, it may have effective scraping and wiping function for various windshield wipers of different curvatures but can not meet the requirement for various windshield wipers of the different lengths. Thus, for another length of the specific windshield wiper aforesaid, all the related components should be additionally re-produced accordingly. Therefore, the production for design of the windshield wiper aforesaid must prepare tremendously various relevant components in stock to meet the manufacturing requirements of various windshield wipers in different lengths and specifications, which will inevitably results in laborious inventory control and strenuous production management accordingly. Basing on the 20 years of experience in manufacturing windshield wipers, the applicant of the present invention is fully aware that the design of the windshield wiper aforesaid can not actually achieve the declared benefit of reducing manufacturing cost essentially.

SUMMARY OF THE INVENTION

The primary object of the present invention is to provide an array combinational type of windshield wiper, which comprises an elastic curved strip, a supporting mount, plural lodging blocks, plural counterweight blocks, an elongate scraper, two enclosing sheaths, a saddling hood and two terminal caps. By means of changing the number and array of the lodging block and counterweight block together with the length of the elastic curved strip, the various windshield wipers of different lengths and specifications can be easily and smoothly produced by flexible and versatile manufacturing process so that not only the total manufacturing cost can be greatly decreased with enhancement of marketing competition but also the environmental protection can be accomplished.

The other object of the present invention is to provide an array combinational type of windshield wiper, which not only evenly distributes the pressing elastic pressure over the windshield but also completely and closely attaches over the windshield so as to increase the scraping and wiping effect of the windshield wiper by means of suitably changing the number and array of the lodging block and counterweight block together with the length of the elastic curved strip.

BRIEF DESCRIPTION OF THE DRAWINGS

FIG. 4 is a perspective view of the elastic curved strip of the present invention.

FIG. 4a is a cross-sectional view along line 4a-4a.

FIG. 5 is a perspective view showing the first step of the assembly procedure according to the present invention.

FIG. 5a is a cross-sectional view along line 5a-5a.

FIG. 6 is a perspective view showing the second step of the assembly procedure according to the present invention.

FIG. 6a is a cross-sectional view along line 6a-6a.

FIG. 9 is a perspective view showing the fifth step of the assembly procedure according to the present invention.

FIG. 9a is a cross-sectional view along line 9a-9a.

FIG. 10 is a perspective view showing the sixth step of the assembly procedure according to the present invention.

FIG. 10a is a cross-sectional view along line 10a-10a.

FIG. 11 is a perspective view showing the seventh step of the assembly procedure according to the present invention.

FIG. 11a is a cross-sectional view along line 11a-11a.

FIG. 13 is a perspective view showing the ninth step of the assembly procedure according to the present invention.

FIG. 13a is a cross-sectional view along line 13a-13a.

FIG. 19a is a cross-sectional view along line 19a-19a.

DETAILED DESCRIPTION OF THE PREFERRED EMBODIMENTS

Figures 1, 1A, 1B, 1C:
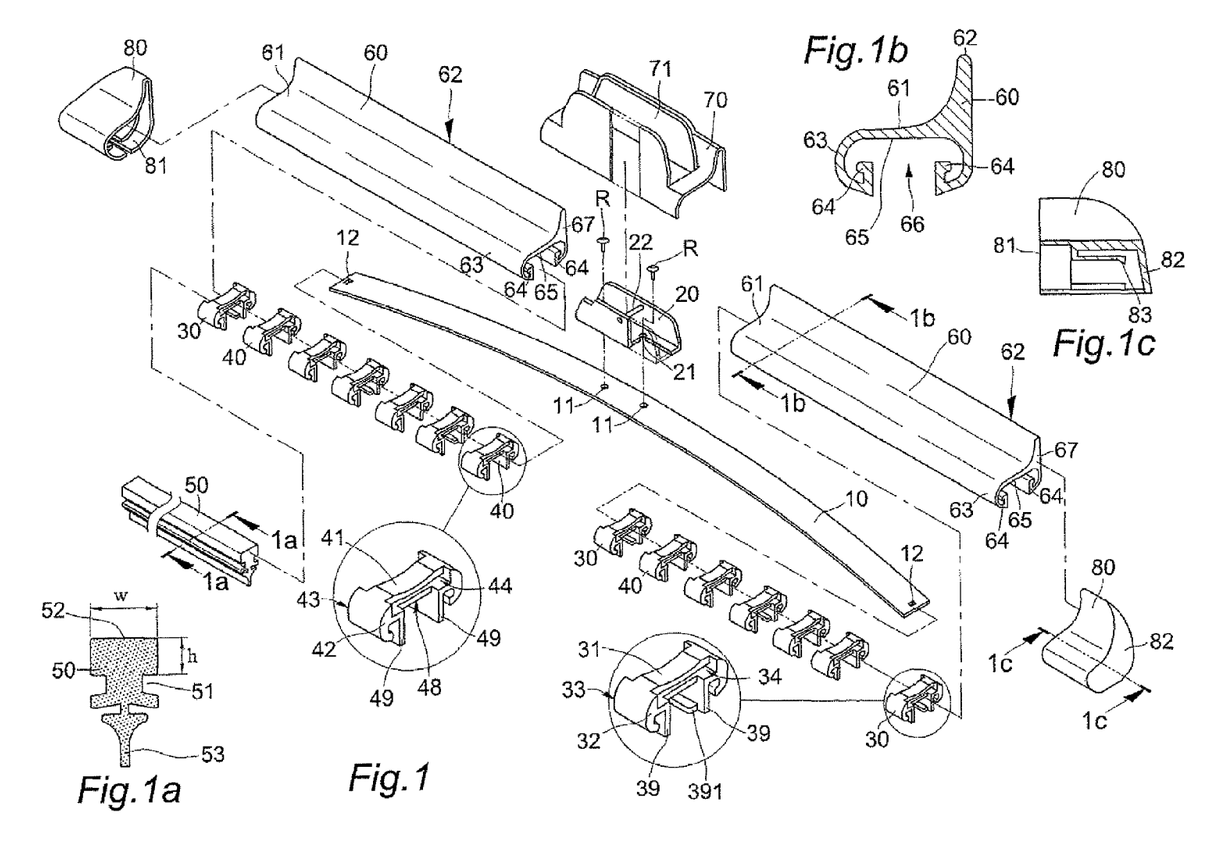
FIGS. 1a, 1b, 1c are cross sectional views along lines 1a-1a, 1b-1b and 1c-1c, respectively.
FIG. 1 is a exploded perspective view of the present invention.
Figure 2:
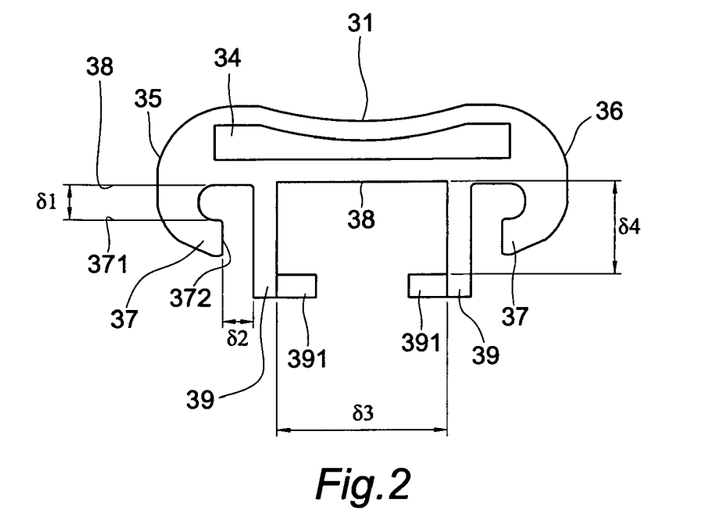
FIG. 2 is a front view of the lodging block of the present invention.
Figure 3:
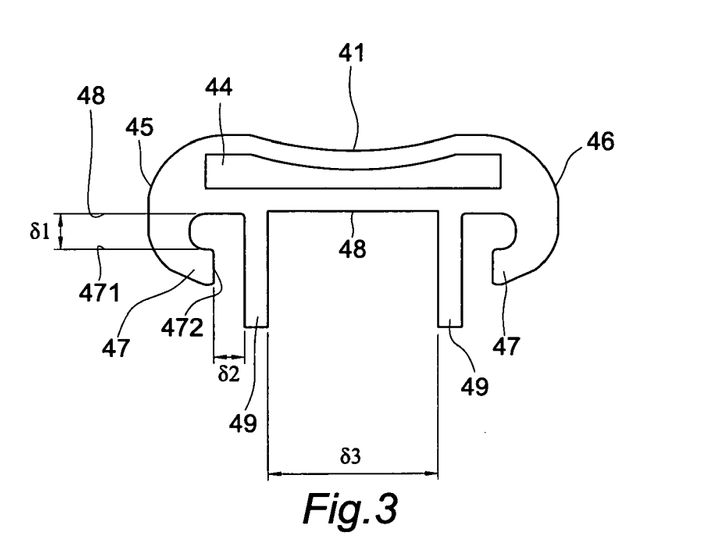
FIG. 3 is a front view of the counterweight block of the present invention.
Figures 4, 4A:
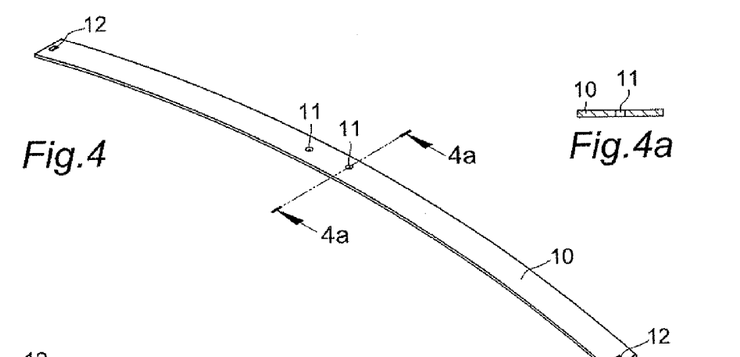

Referring to FIGS. 1 to 3, an array combinational type of windshield wiper of the present invention comprises an elastic curved strip 10, a supporting mount 20, plural lodging blocks 30, plural counterweight blocks 40, an elongate scraper 50, two enclosing sheaths 60, a saddling hood 70 and two terminal caps 80.

Referring to FIGS. 1 to 3, the elastic curved strip 10 which being made of metal flat strip in downwards curved slat, having a pair of rivet holes 11 punched in the middle and a fitting hole 12 penetrated near each of short lateral ends thereat.

Figures 16, 17:
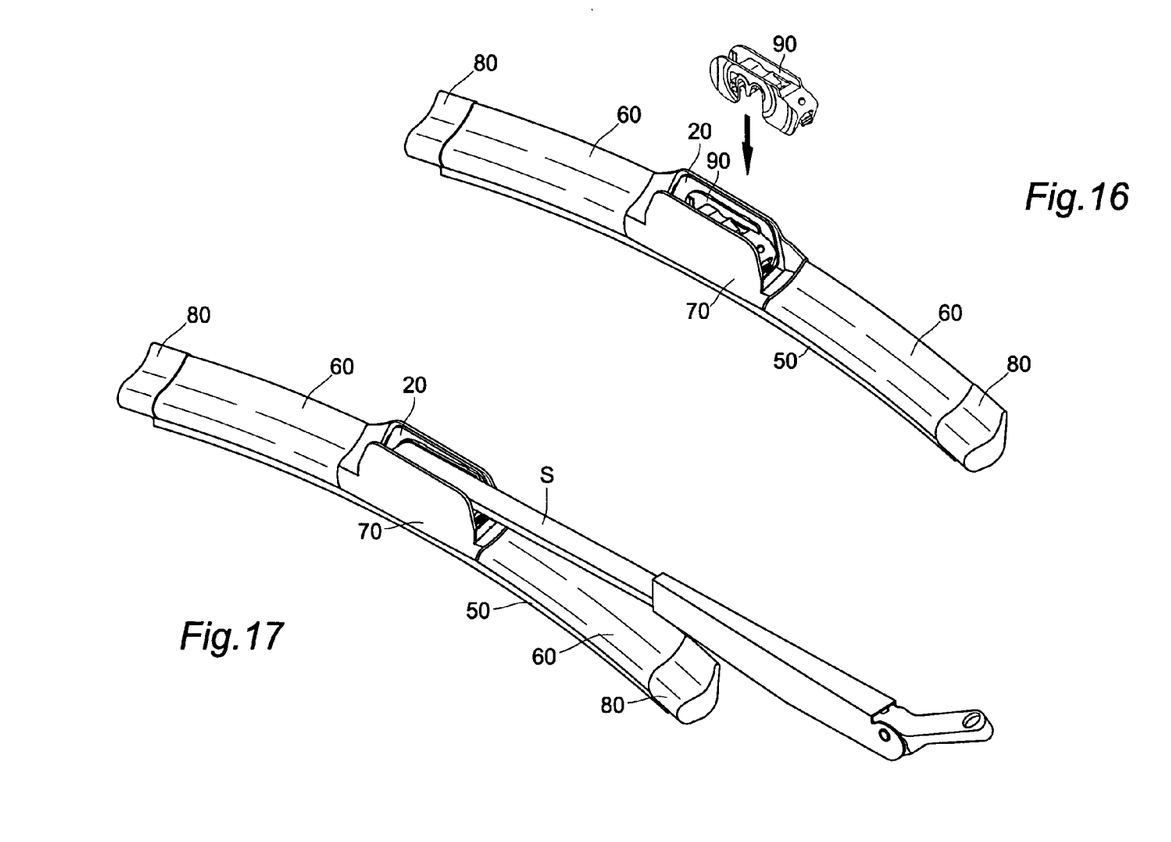
FIG. 16 is a perspective schematic view showing the combination of the wiper adapter with the present invention.
FIG. 17 is a perspective view showing the combination of the wiper arm with the present invention.

Referring to FIGS. 1 to 3, FIG. 16 and FIG. 17, the supporting mount 20 which being pressed U-shaped metal, having a pair of perforated holes 21 punched in the middle of the internal sole for corresponding to the pair of rivet holes 11 in the elastic curved strip 10 and a fixing spindle 22 straddled over both upright flanks thereof for connection with a wiper adapter 90 (as shown in the FIG. 16) such that it being securely fixed at the end of the wiper arm S (as shown in the FIG. 17).

Referring to FIGS. 1 to 3, the plural lodging blocks 30 which being unitary extruding molded body of plastic material and set on the elastic curved strip 10 in array manner, having an insetting sleeve slit 34 penetrated form front surface 32 through back surface 33 near the top surface 31 thereof so that the cross sectional shape of the insetting sleeve slit 34 being same as that of the elastic curved strip 10 with tolerance consistent with the transition fit or clearance fit after assembly; a pair of symmetrical and parallel hooks 37 being downwards juxtaposed apart at inside of the left flank 35 and right flank 36 of the insetting sleeve slit 34; a pair of symmetrical and parallel suspending joists 39 with a clipping jut 391 each being downwards juxtaposed apart at internal sole 38 so that an interval δ1 being formed between the top surface 371 of the hook 37 and the internal sole 38 thereof, an interval δ2 being formed between the lug surface 372 of the hook 37 and the outer surface of the suspending joist 39, an interval δ3 being formed between the pair of the suspending joists 39, as well as an interval δ4 being formed between the top surface of the clipping juts 391 and the internal sole 38 (as shown in the FIG. 2).

Referring to FIGS. 1 to 3, the plural counterweight blocks 40 which being unitary extruding molded body of plastic or metal material and set on the elastic curved strip 10 in interlaying array manner between the lodging blocks 30, having same structure, shape and size as those of the lodging block 30 that an insetting sleeve slit 44 penetrated form front surface 42 through back surface 43 near the top surface 41 thereof so that the cross sectional shape of the insetting sleeve slit 44 being same as that of the elastic curved strip 10 with tolerance consistent with the transition fit or clearance fit after assembly; a pair of symmetrical and parallel hooks 47 being downwards juxtaposed apart at inside of the left flank 45 and right flank 46 of the insetting sleeve slit 44; a pair of symmetrical and parallel suspending joists 49 being downwards juxtaposed apart at internal sole 48 so that an interval δ1 being formed between the top surface 471 of the hook 47 and the internal sole 48 thereof, an interval δ2 being formed between the lug surface 472 of the hook 47 and the outer surface of the suspending joist 49, as well as an interval δ3 being formed between the pair of the suspending joists 49 (as shown in the FIG. 3).

Referring to FIGS. 1 and 2, the elongate scraper 50 which being unitary extruding molded body of elastic material, having a pair of symmetrical and parallel elongate flutes 51 being juxtaposed apart on both sides thereof and a scraper blade 53 formed at the lower section in taper manner, wherein, the height h between the elongate flute 51 and top surface 52 being slightly less than the interval δ4 between the top surface of the clipping juts 391 and the internal sole 38 of the lodging block 30 (as shown in sectional view 1a of the FIG. 1); and the upper section width w of the top surface 52 being slightly less than the interval δ3 between the pair of the suspending joists 39 (as shown in the FIG. 2) for being held therein and securely clamped by two clipping juts 391 respectively.

Referring to FIG. 1, the two enclosing sheaths 60 which being unitary extruding body of elastic material molded into elongate hollow cover, having a curved ridge 62 formed at one longitudinal side of the ascending top surface 61 and a pair of symmetrical and parallel of flukes 64 being downwards juxtaposed apart at both of the elongate nosing 63 (as shown in sectional view 1b of the FIG. 1); Wherein, the cross sectional shape of the fluke 64 being same as that of hook 37, 47 of the lodging block 30 and counterweight block 40, besides, the holding space 66 enclosed by the flukes 64 and internal sole 65 thereof just encompassing exactly the top surfaces 31, 41, left flanks 35, 45 and right flanks 36, 46 of the lodging block 30 and counterweight block 40 so that the fluke 64 being completely inserted between the interval δ1 and interval δ2 of the lodging block 30 and counterweight block 40 either.

Referring to FIG. 1, the saddling hood 70 which being used to cap on the supporting mount 20, having a pair of symmetrical and parallel of setting grooves 71 juxtaposed apart at both internal longitudinal sides thereof for insetting of the supporting mount 20 and the cross sectional shape of the both longitudinal ends just encompassing exactly the integral surface for the ascending top surface 61 and two elongate nosing 63 of the enclosing sheath 60.

Referring to FIG. 1, the two terminal caps 80 each of which being a hollow cuboid used to cap each flush terminal 67 of the enclosing sheath 60, having each rear closed end 82 and front opening end 81, whose cross sectional shape being the same as that of each flush terminal 67 of the enclosing sheath 60 but with internal size being slightly larger than the outer size of the each flush terminal 67 of the enclosing sheath 60; besides, a clamping tenon 83 being horizontally configured on the internal central top side near the opening end 81 towards the closed end 82 therein (as shown in sectional view 1c of the FIG. 1).

Figures 5, 5A:
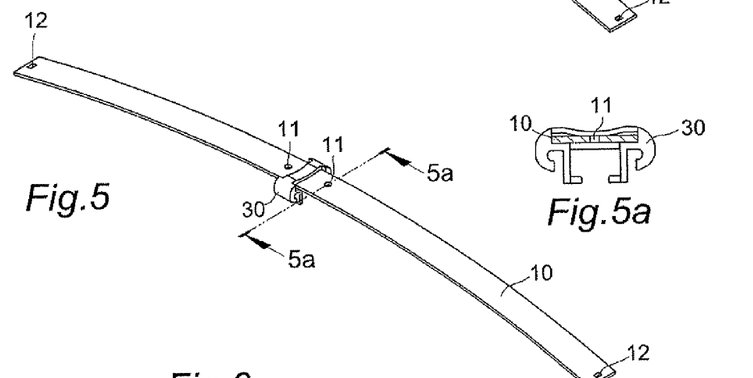
Figures 6, 6A:
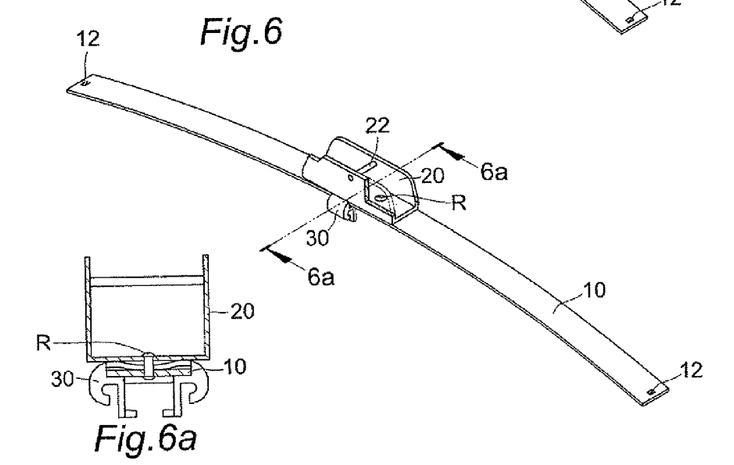
Figures 7, 8:
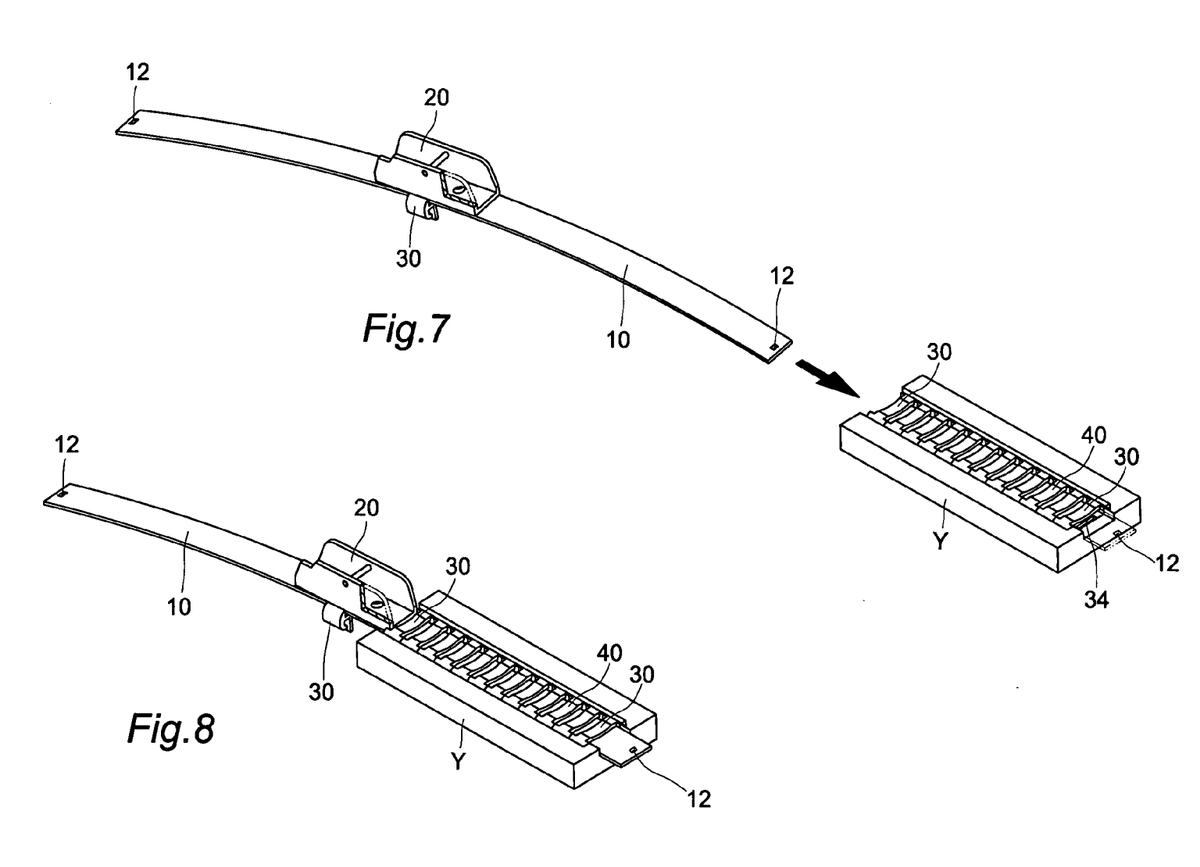
FIG. 7 is a perspective view showing the third step of the assembly procedure according to the present invention.
FIG. 8 is a perspective view showing the fourth step of the assembly procedure according to the present invention.
Figures 9, 9A:
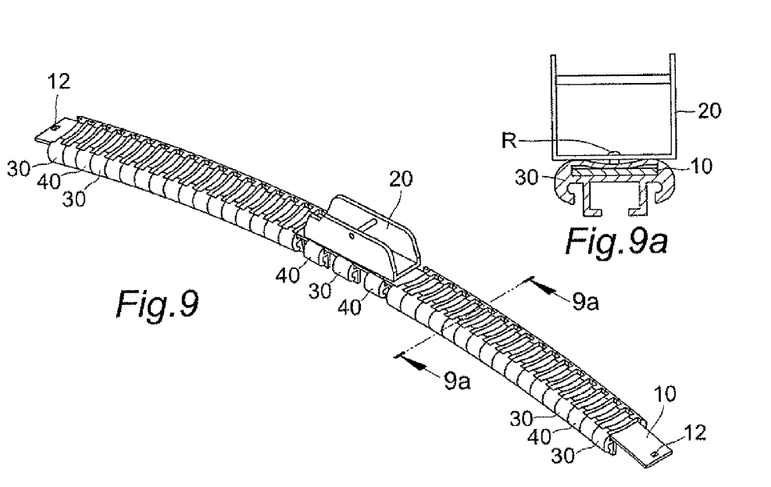
Figures 10, 10A:
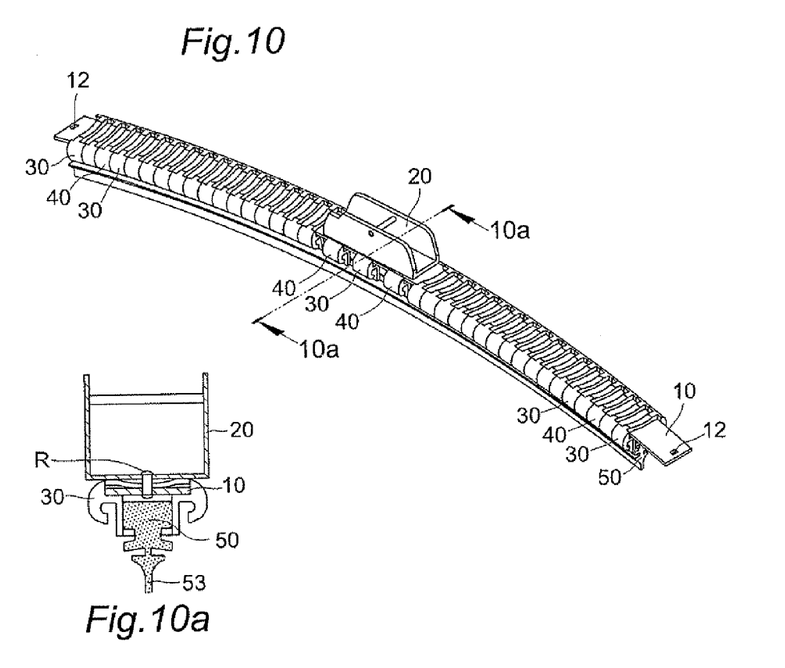
Figures 11, 11A:
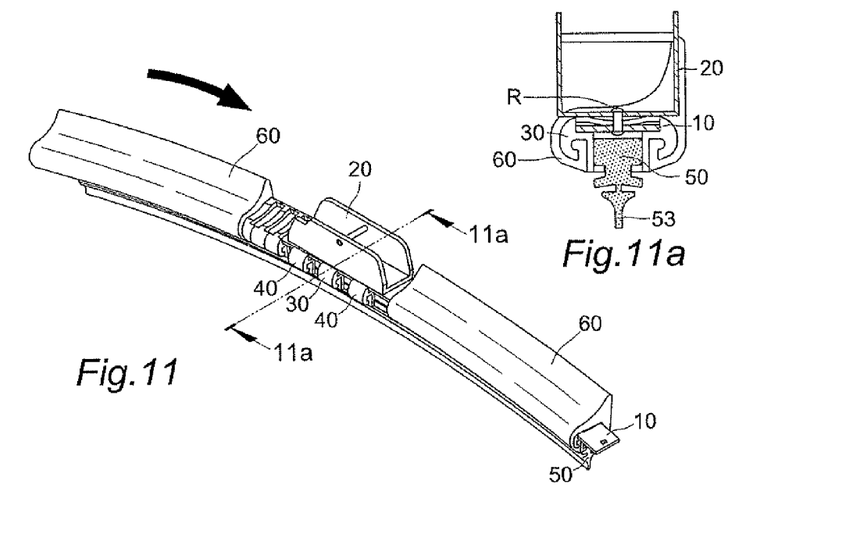
Figures 12, 12A, 12B:
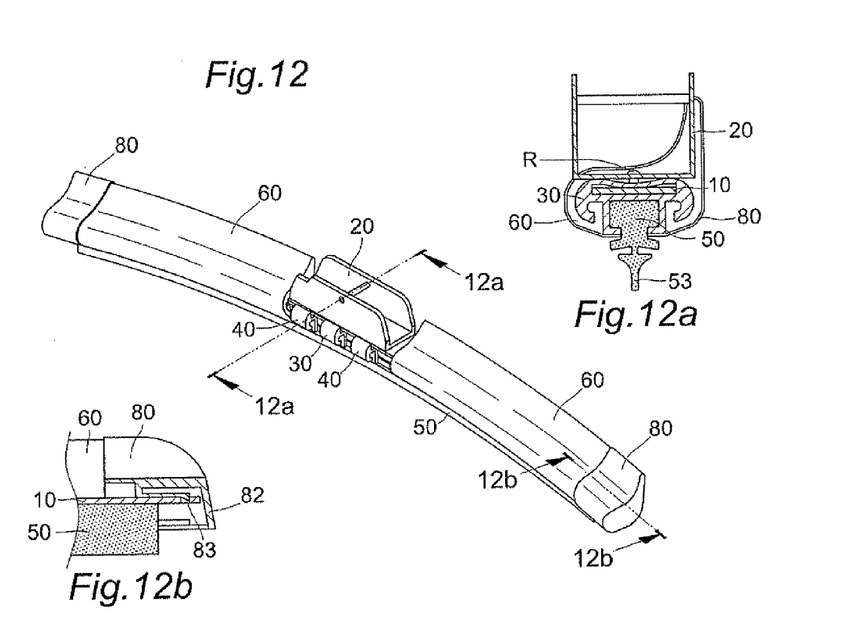
FIG. 12 is a perspective view showing the eighth step of the assembly procedure according to the present invention.
FIGS. 12a and 12b are cross-sectional view along line 12a-12a and 12b-12b, respectively.
Figures 13, 13A:
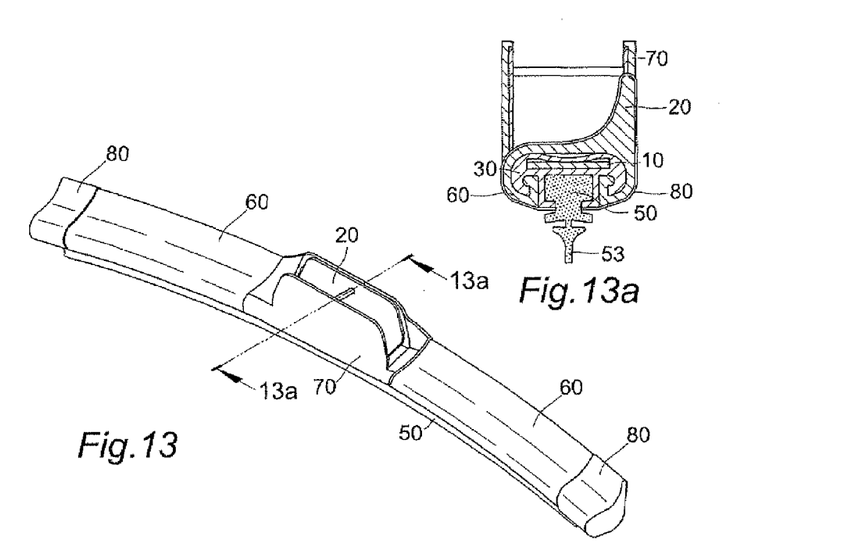

Further to referring the FIG. 4 through FIG. 13, the assembly steps according to the present invention are as below:

a. Set the insetting sleeve slit 34 of the lodging block 30 between two rivet holes 11 of the elastic curved strip 10 (as shown in the FIG. 5 and a sectional view taken along the direction indicated by a line 5a-5a in FIG. 5).

b. Put the supporting mount 20 in the middle of the elastic curved strip 10 and fix it thereon by two rivet holes 11 driving through the perforated holes 21 of the supporting mount 20 and rivet holes 11 of the elastic curved strip 10 (as shown in the FIG. 6 and a sectional view taken along the direction indicated by a line 6a-6a in FIG. 6).

c. Orderly put the lodging block 30 and counterweight block 40 in the arraying pad Y one by one, then align and run one end of one elastic curved strip 10 through the arrayed lodging blocks 30 and counterweight blocks 40 in the arraying pad Y (as shown in the FIGS. 7 and 8).

d. As the procedure in the step c, align and run one end of the other elastic curved strip 10 through the arrayed lodging blocks 30 and counterweight blocks 40 in the arraying pad Y so that the lodging block s30, counterweight blocks 40 and elastic curved strip 10 are integrated together (as shown in the FIG. 9 and a sectional view taken along the direction indicated by a line 9a-9a in FIG. 9).

e. Align and set the pair of elongate flutes 51 of the elongate scraper 50 in the pair of suspending joists 39, 49 and clipping juts 391 of each lodging block 30 and counterweight block 40 so that said elongate scraper 50 is firmly held by all lodging blocks 30 and counterweight blocks 40 (as shown in the FIG. 10 and a sectional view taken along the direction indicated by a line 10-10 in FIG. 10).

f. Respectively align and set each flush terminal 67 of the two enclosing sheaths 60 in each longitudinal end of the elastic curved strip 10 up to abutting with each end edge of the supporting mount 20 so that said elastic curved strip 10, lodging blocks 30 and counterweight blocks 40 are completely enclosed by the two enclosing sheaths 60 (as shown in the FIG. 11 and a sectional view taken along the direction indicated by a line 11a-11a in FIG. 11).

g. Respectively align and set each opening end 81 of the two terminal cap 80 on each longitudinal end of the elastic curved strip 10 up to the bucking snap of the clamping tenon 83 with each fitting hole 12 of the elastic curved strip 10 so that two enclosing sheaths 60, lodging blocks 30 and counterweight blocks 40 are completely confined by the two terminal cap 80 therein unable to drop off (as shown in the FIG. 12 and two sectional views taken along the direction indicated by a line 12a and 12b in FIG. 12). Finally set the saddling hood 70 over the supporting mount 20 so that both upright flanks of said supporting mount 20 are completely inset by the two setting grooves 71; Meanwhile, each other flush terminal 67 of the enclosing sheath 60 abutting with each end edge of the supporting mount 20 is also enclosed therein; Thus, the entire assembly is finished (as shown in the FIG. 13 and a sectional view taken along the direction indicated by a line 13a-13a in FIG. 13).

Wherein, the counterweight block 40, which is depicted in the step c, is usually unitary extruding molded of metal material and set on the elastic curved strip 10 in interlaying array manner between the lodging blocks 30 in accordance with the pressure distribution and curvature of the windshield G so as to achieve the function of counterweight. However, the counterweight block 40 can also be made of plastic material if it is not to be served as counterweight.

Figure 14:
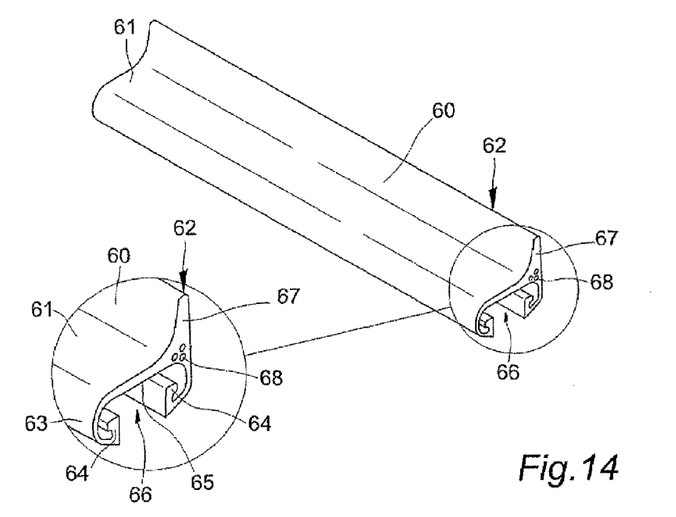
FIG. 14 is a perspective view for the enclosing sheath in another embodiment of the present invention.
Figure 15:
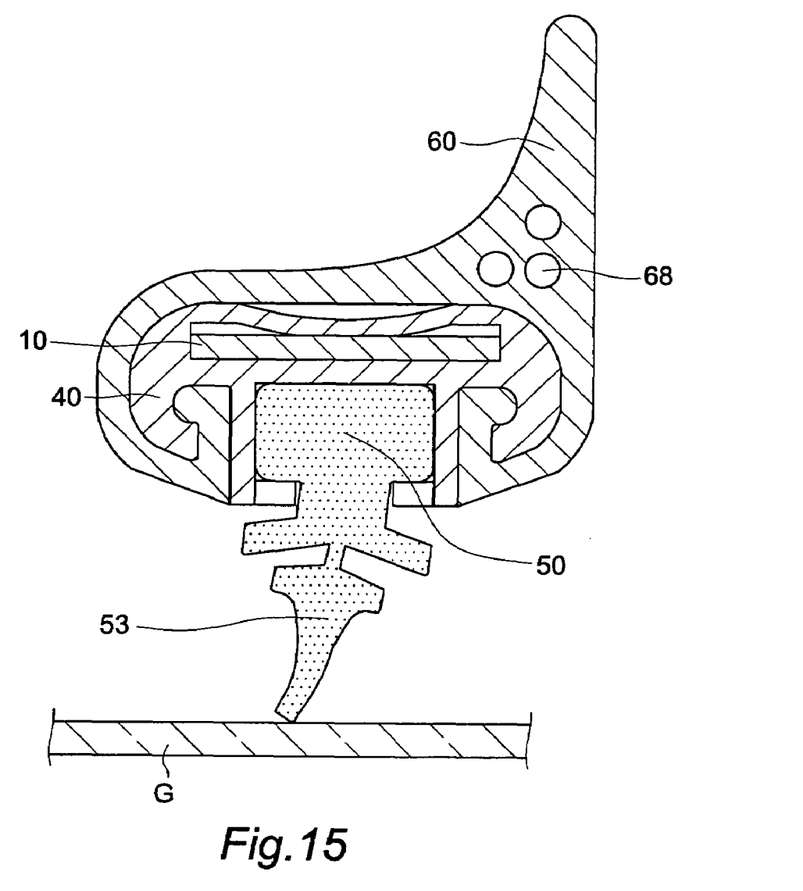
FIG. 15 is a sectional view for the enclosing sheath in another embodiment of the present invention.

As shown in the FIG. 14 and FIG. 15, in the upper portion of the enclosing sheath 60 of the present invention near the curved ridge 62 between both flush terminals 67, plural hollow tunnels 68 can be created therein so as to reduce the total weight and save material cost without affecting the scraping and wiping function of the windshield wiper against the windshield G.

Figure 18:
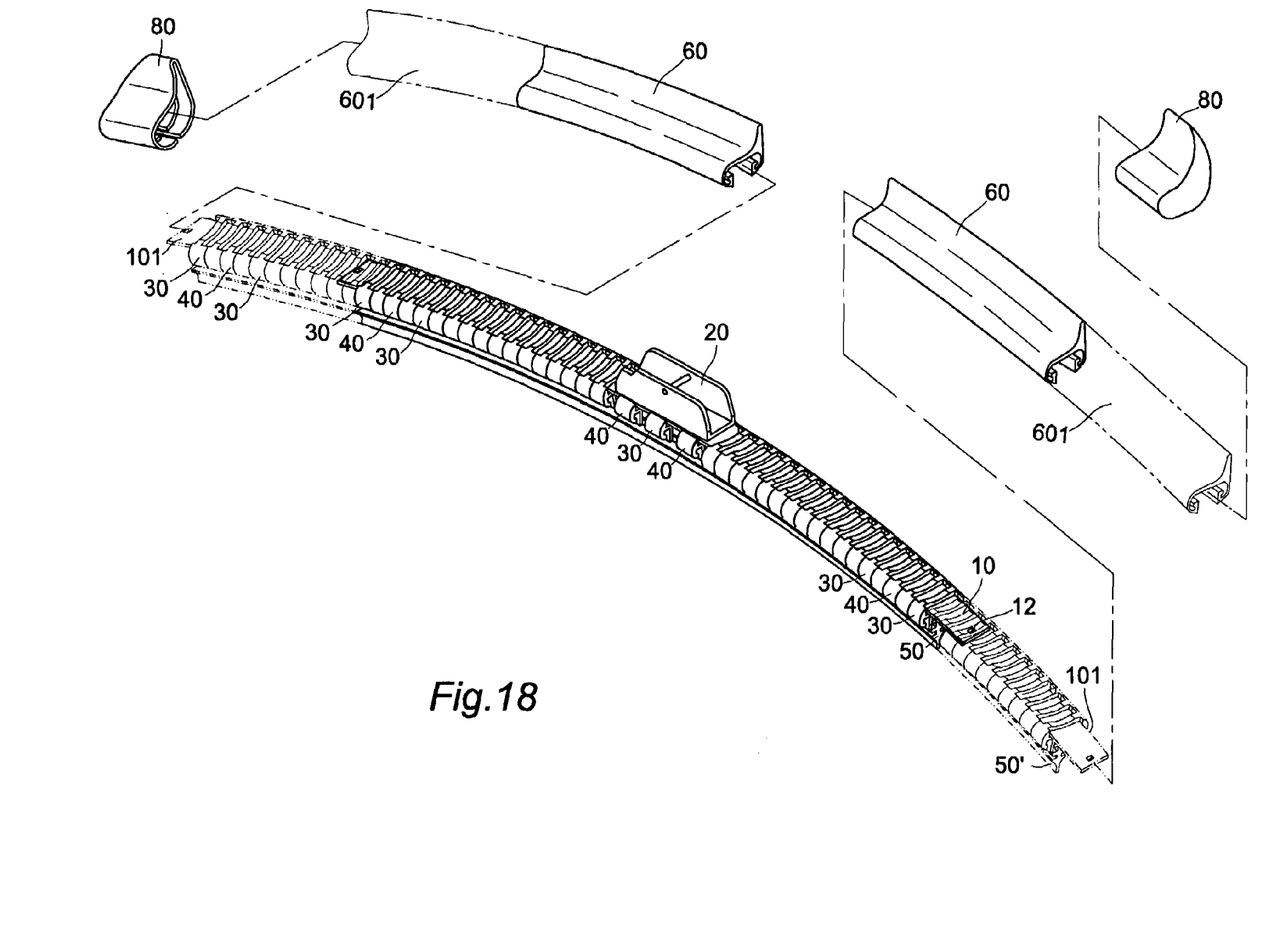
FIG. 18 is a exploded perspective view for the other embodiment of the present invention.

As further shown in the FIG. 18, the number of the arrayed lodging blocks 30 and counterweight blocks 40 can be accordingly increased together with the cutting length of the elongate scraper 50' and enclosing sheath 601 during extruding mold if the length of the elastic curved strip 101 of the present invention is required to extend so that various windshield wipers of different length and specifications can be smoothly and easily produced without costing any extra expense to make new component for fitting in with the modified length and specifications.

Figure 19:
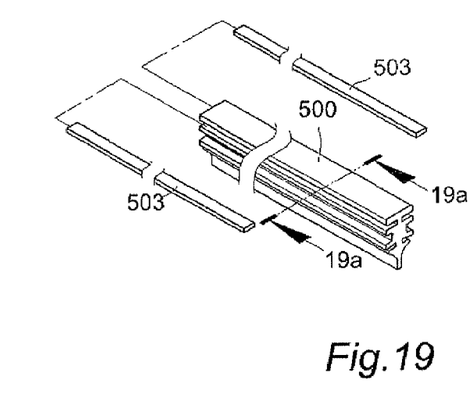
FIG. 19 is a exploded perspective view showing the elongate scraper for another embodiment of the present invention.
Figure 19A:
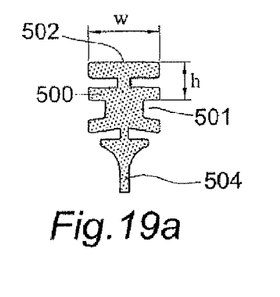
Figure 20:
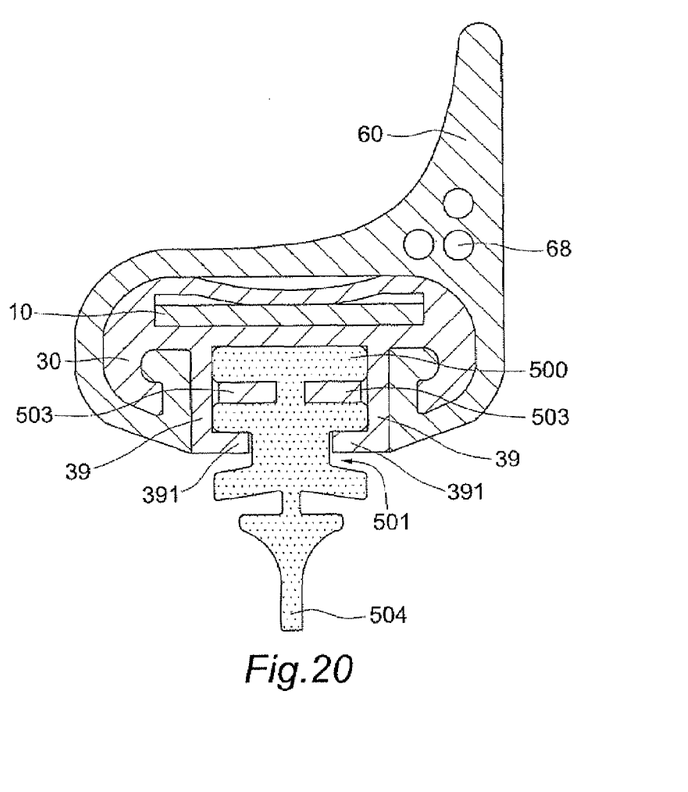
FIG. 20 is a sectional illustrative view showing the elongate scraper inserted in the lodging blocks for another embodiment of the present invention.

As shown in the FIG. 19 and FIG. 20, they are the schematic views showing elongate scraper 500 according to another embodiment of the present invention. The elongate scraper 500, which being unitary extruding molded body of elastic material, having a pair of symmetrical and parallel elongate flutes 501 being juxtaposed apart on both sides thereof, a pair of elastic metal splints 503 being respectively embedded in a pair of symmetrical and parallel elongate flutes between the elongate flutes 501 and the top surface 502 and a scraper blade 504 formed at the lower section in taper manner, wherein, the height h between the elongate flute 501 and top surface 502 being slightly less than the interval $\delta 4$ between the top surface of the clipping juts 391 and the internal sole 38 of the lodging block 30; and the upper section width w of the top surface 502 being slightly less than the interval $\delta 3$ between the pair of the suspending joists 39 for being held therein and securely clamped by two clipping juts 391 respectively.

In summary, by means of changing the number and array of the lodging block and counterweight block, the present invention can quickly manufactures various windshield wipers of different length and specifications without any extra new component due to variation of wiper length and specifications so that the optimal flexible and versatile manufacturing process can be logically achieved to have multiple benefits in cost-saving in inventory management and manufacturing cost as well as the enhancement of the marketing competition other than the environmental protection effect.

What is claimed is:

1. An array combinational-type of windshield wiper, comprising:

an elastic curved strip made from metal, the curved strip having a pair of rivet holes formed in a middle portion thereof and a fitting hole formed near first and second end portions thereof;

a U-shaped supporting mount having an internal sole and a pair of upright flanks, a pair of holes being formed in a middle portion of the internal sole which correspond to the pair of rivet holes formed in the elastic curved strip, and a fixing spindle having first and second ends thereof respectively connected to a respective upright flank of the pair of upright flanks;

a plurality of lodging blocks made from a plastic material and disposed on the elastic curved strip in an array, an insetting sleeve slit being formed in each lodging block from a front surface to a back surface adjacent a top surface thereof such that a cross-sectional shape of the insetting sleeve slit is the same as a cross-sectional shape of the elastic curved strip, a pair of symmetrical hooks suspending from first and second flanks of the lodging block, each hook forming a retaining space in the lodging block and having a top surface disposed below the insetting sleeve slit, a cavity being formed in a bottom portion of the lodging block and having an internal sole formed at a top portion of the cavity, a pair of symmetrical joists suspending from the bottom portion of the lodging block, each joist having a clipping jut disposed at a bottom portion of the cavity, a first distance is defined as the distance between the top surface of the hook and the internal sole of the cavity, a second distance is defined as the distance between a respective hook of the pair of hooks and a respective joist of the pair of joists, a third distance is defined as the distance between each joist of the pair of joists, and a fourth distance is defined as the distance between the internal sole of the cavity and the clipping juts;

a plurality of counterweight blocks made from a plastic or metal material and disposed on the elastic curved strip in an interlaying array between the lodging blocks, an insetting sleeve slit being formed in each lodging block from a front surface to a back surface adjacent a top surface thereof such that a cross-sectional shape of the insetting sleeve slit is the same as a cross-sectional shape of the elastic curved strip, a pair of symmetrical hooks suspending from first and second flanks of the lodging block, each hook forming a retaining space in the counterweight block and having a top surface disposed below the insetting sleeve slit, a recess being formed in a bottom portion of the counterweight block and having an internal sole formed at a top portion of the recess, a pair of symmetrical joists suspending from the bottom portion of the counterweight block, a fifth distance defined as the distance between the top surface of the hook of the counterweight block and the internal sole of the recess is the same as the first distance, a sixth distance defined as the distance between a respective hook of the pair of hooks of the counterweight block and a respective joist of the pair of joists of the counterweight block is the same as the second distance, and a seventh distance defined as the distance between each joist of the pair of joists of the counterweight block is the same as the third distance;

an elongate scrapper made from an elastic material and having a first pair of symmetrical elongate flutes formed in first and second sides of the elongate scrapper, a lower portion of the scrapper is tapered to form a scrapper blade, an eighth distance defined as the distance between the first elongate flutes and a top surface of the elongate scrapper is less than the fourth distance, and a width of an upper section of the elongate scrapper is less than the third distance such that the upper section of the elongate scrapper is received within the cavity of the lodging block and the recess of the counterweight block;

two enclosing sheaths made from an elastic material, each sheath having a curved ridge formed at an intersection of a top surface and a side surface of the sheath and a pair of symmetrical flukes downwardly disposed at first and second side portions thereof, a cross-sectional shape of the flukes being the same as a cross-sectional shape of the retaining space of the lodging blocks and the retaining space of the counterweight blocks such that the flukes are received within the retaining space of the lodging blocks and the retaining space of the counterweight blocks;

a saddling hood for capping the supporting mount, the saddling hood having a pair of parallel setting grooves disposed at first and second sides of the saddling hood for receiving the supporting mount; and two terminal caps for capping the enclosing sheaths, the terminal caps having a cross-sectional shape defined as substantially the same as a cross-sectional shape of the enclosing sheaths, an internal size of the terminal caps being at least larger than an outer size of the enclosing sheaths, and a clamping tenon being disposed on an inside surface of the terminal caps.

2. The windshield wiper of claim 1, wherein a plurality of hollow channels are formed in an upper portion of the enclosing sheaths.

3. The windshield wiper of claim 1, wherein a pair of elastic metal splints is embedded in a second pair of symmetrical elongate flutes disposed between the first elongate flutes and the top surface of the elongate scrapper.

* * * * *